US012741913B2

(12) United States Patent
Sudre et al.

(10) Patent No.: US 12,741,913 B2
(45) Date of Patent: Sep. 22, 2026

(54) FABRICATION OF FIBROUS PREFORMS IN CMC MANUFACTURE

(71) Applicant: RTX Corporation, Farmington, CT (US)

(72) Inventors: Olivier H. Sudre, Glastonbury, CT (US); Zachary Paul Konopaske, West Hartford, CT (US); Brendan Lenz, North Branford, CT (US); Nil Parikh, Newington, CT (US); John D. Riehl, Hebron, CT (US)

(73) Assignee: RTX COrporation, Farmington, CT (US)

( * ) Notice: Subject to any disclaimer, the term of this patent is extended or adjusted under 35 U.S.C. 154(b) by 489 days.

(21) Appl. No.: 18/379,947

(22) Filed: Oct. 13, 2023

(65) Prior Publication Data

US 2025/0122126 A1 Apr. 17, 2025

(51) Int. Cl.
*C04B 35/628* (2006.01)
*C04B 41/00* (2006.01)
*C04B 41/45* (2006.01)

(52) U.S. Cl.
CPC .... *C04B 35/62844* (2013.01); *C04B 41/0072* (2013.01); *C04B 41/457* (2013.01); *C04B 2235/48* (2013.01); *C04B 2235/614* (2013.01)

(58) Field of Classification Search
CPC .......... C04B 35/62844; C04B 41/0072; C04B 41/457; C04B 2235/48; C04B 2235/614
See application file for complete search history.

(56) References Cited

U.S. PATENT DOCUMENTS

| | | |
|---|---|---|
| 5,015,540 A | 5/1991 | Borom et al. |
| 5,128,199 A | 7/1992 | Iyer et al. |
| 5,154,787 A | 10/1992 | Gardner et al. |
| 5,164,229 A | 11/1992 | Hay |
| 5,250,243 A | 10/1993 | Allaire et al. |
| 5,316,797 A | 5/1994 | Hazlebeck et al. |
| 5,628,938 A | 5/1997 | Sangeeta et al. |

(Continued)

FOREIGN PATENT DOCUMENTS

| | | | | |
|---|---|---|---|---|
| BR | 112014005317 | * | 6/2021 | ............ D06M 17/00 |
| CN | 101939472 | * | 1/2011 | ............ D03D 11/02 |

(Continued)

OTHER PUBLICATIONS

English Translation of BR 112014005317.*

(Continued)

*Primary Examiner* — Bret P Chen
(74) *Attorney, Agent, or Firm* — Kinney & Lange, P.A.

(57) ABSTRACT

A method of fabricating a fibrous ceramic preform includes forming a plurality of coated ceramic tows by introducing a polymeric composition to each of a plurality of ceramic tows, and dispersing and stabilizing each of the plurality of ceramic tows such that a coating of a first polymer binder forms on individual filaments of respective ones of the plurality of ceramic tows, incorporating the plurality of coated ceramic tows into a ceramic fabric, applying a tackifier composition comprising a second polymer binder and a second solvent to the ceramic fabric, and incorporating the ceramic fabric into the preform. The first polymer binder is insoluble in the second solvent.

16 Claims, 4 Drawing Sheets

(56) References Cited

U.S. PATENT DOCUMENTS

| | | | | |
|---|---|---|---|---|
| 5,733,655 | A | 3/1998 | Bors et al. | |
| 5,756,206 | A | 5/1998 | Davies et al. | |
| 5,951,764 | A | 9/1999 | Hay et al. | |
| 6,258,737 | B1 | 7/2001 | Steibel et al. | |
| 6,365,233 | B1 | 4/2002 | Corman et al. | |
| 8,609,558 | B2 * | 12/2013 | Riehl | C04B 35/63452 442/178 |
| 9,221,218 | B2 | 12/2015 | Roberts et al. | |
| 9,540,509 | B2 | 1/2017 | Kummer-dörner et al. | |
| 9,714,686 | B2 * | 7/2017 | Moore | B22D 19/0081 |
| 10,648,065 | B2 | 5/2020 | Coyle et al. | |
| 10,822,280 | B2 | 11/2020 | Harris et al. | |
| 10,829,419 | B2 * | 11/2020 | Jackson | C04B 35/583 |
| 11,117,838 | B2 | 9/2021 | Steffier et al. | |
| 11,220,462 | B2 | 1/2022 | Beaber et al. | |
| 2007/0096371 | A1 * | 5/2007 | McGuigan | C04B 35/80 264/650 |
| 2013/0167374 | A1 | 7/2013 | Kirby et al. | |
| 2017/0029340 | A1 | 2/2017 | Weaver et al. | |
| 2017/0034791 | A1 | 2/2017 | Tohzaka et al. | |
| 2017/0144925 | A1 * | 5/2017 | Dunn | C04B 35/80 |
| 2019/0084891 | A1 | 3/2019 | Steibel et al. | |
| 2019/0169724 | A1 | 6/2019 | Coyle et al. | |
| 2019/0359531 | A1 * | 11/2019 | Steffier | C04B 35/80 |
| 2020/0199026 | A1 | 6/2020 | Tang et al. | |
| 2021/0047241 | A1 | 2/2021 | Beaber et al. | |
| 2023/0019661 | A1 * | 1/2023 | Lenz | B29B 15/127 |
| 2023/0192556 | A1 * | 6/2023 | Colby | F01D 5/147 501/88 |
| 2023/0192558 | A1 | 6/2023 | Konopaske et al. | |
| 2023/0391680 | A1 * | 12/2023 | Callaway | C04B 35/565 |

FOREIGN PATENT DOCUMENTS

| | | | | |
|---|---|---|---|---|
| EP | 4144709 | A1 | 3/2023 | |
| EP | 4197781 | A1 | 6/2023 | |
| EP | 4512789 | A1 | 2/2025 | |
| GB | 2333737 | * | 4/1999 | B29B 9/14 |
| JP | 2006-52135 | * | 2/2006 | C04B 35/80 |
| JP | 2018-177635 | * | 11/2018 | C04B 41/87 |
| WO | 9420434 | A1 | 9/1994 | |
| WO | 9850211 | A1 | 11/1998 | |

OTHER PUBLICATIONS

Extended European Search Report for EP Application No. 24201200.3, dated Mar. 14, 2025, 9 pages.

Extended European Search Report for EP Application No. 24195717.4, dated Jan. 2, 2025, 9 pages.

* cited by examiner

FABRICATION OF FIBROUS PREFORMS IN CMC MANUFACTURE

BACKGROUND

The present invention relates to ceramic matrix composites (CMCs) and, more particularly, to the manufacturing of fibrous ceramic preforms for use in CMCs.

In a CMC component, fiber-to-fiber contact can be detrimental to in-plane properties and interlaminar properties, with fiber touching potentially leading to coordinated local fracture under in-plane load or weakness in the through-thickness direction due to lack of inter-fiber matrix connectivity. This can cause defects and failure locations when exposed to the operating environment through cracks in the matrix. Accordingly, dispersion of filaments within ceramic tows can be critical for CMC performance.

SUMMARY

A method of fabricating a fibrous ceramic preform includes forming a plurality of coated ceramic tows by introducing a polymeric composition to each of a plurality of ceramic tows, and dispersing and stabilizing each of the plurality of ceramic tows such that a coating of a first polymer binder forms on individual filaments of respective ones of the plurality of ceramic tows, incorporating the plurality of coated ceramic tows into a ceramic fabric, applying a tackifier composition comprising a second polymer binder and a second solvent to the ceramic fabric, and incorporating the ceramic fabric into the preform. The first polymer binder is insoluble in the second solvent.

Figure 1:
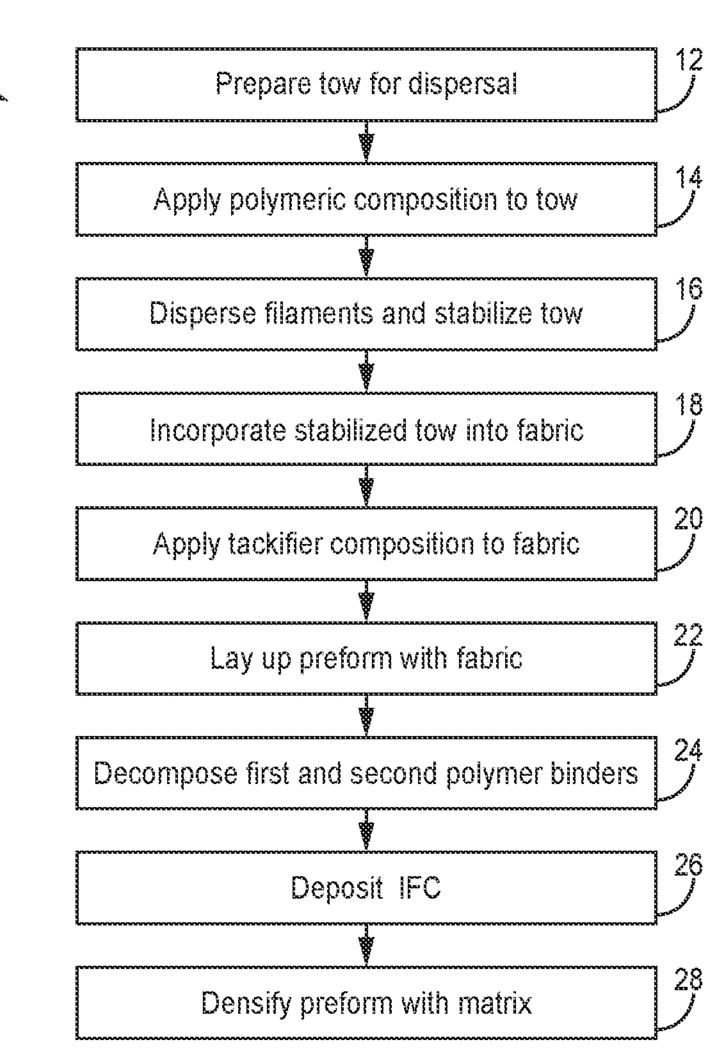
FIG. 1 is a flow chart illustrating steps of a method for preparing a CMC component from dispersed tows.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

This disclosure presents means for increasing the spacing between filaments of a ceramic tow. More specifically, filaments can be coated with a polymer binder to increase inter-filament spacing which can facilitate both the application of the interface coating (IFC) on the filaments and infiltration of matrix into the ceramic tows.

Figure 2:
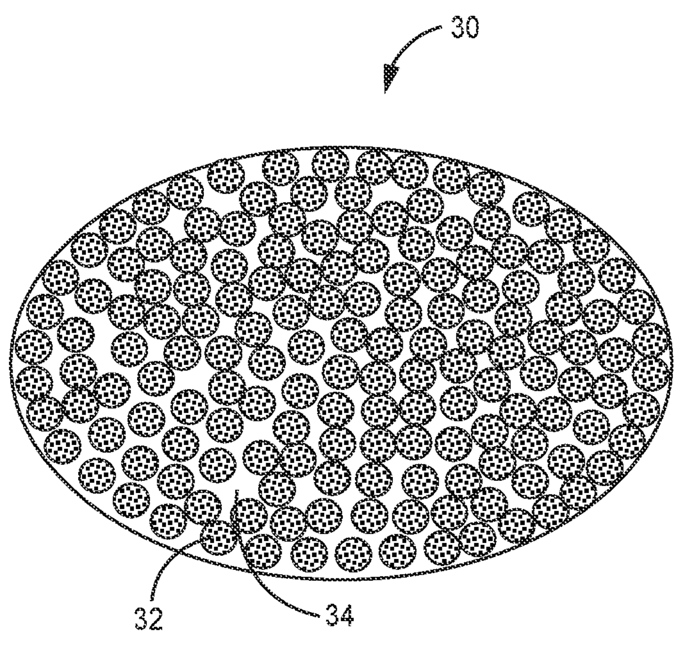
FIG. 2 is a simplified cross-sectional illustration of a ceramic tow in a first state.
Figure 3:
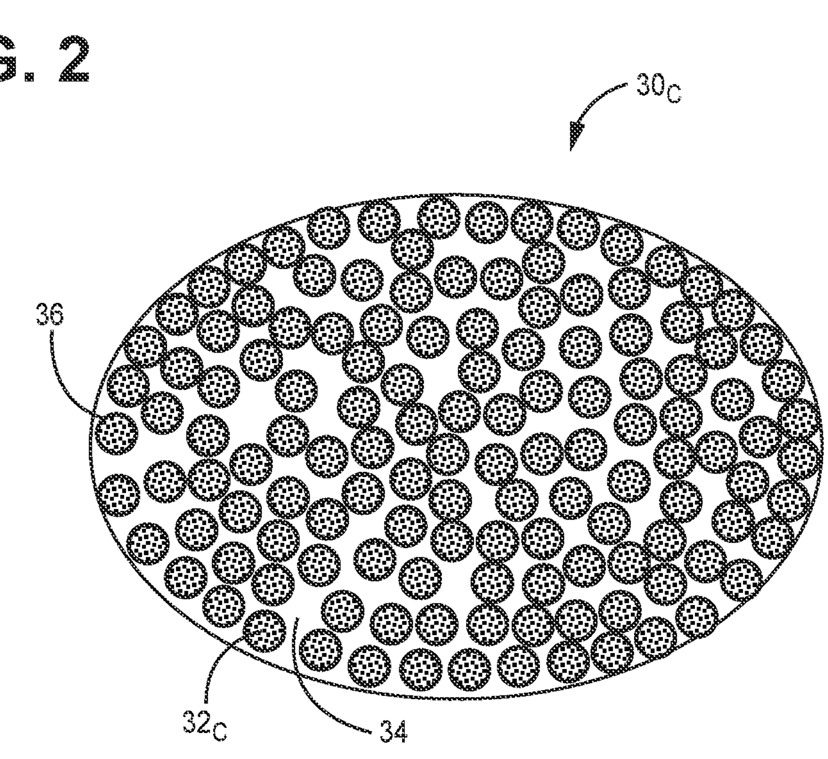
FIG. 3 is a simplified cross-sectional illustration of the ceramic tow in a second state.
Figure 4:
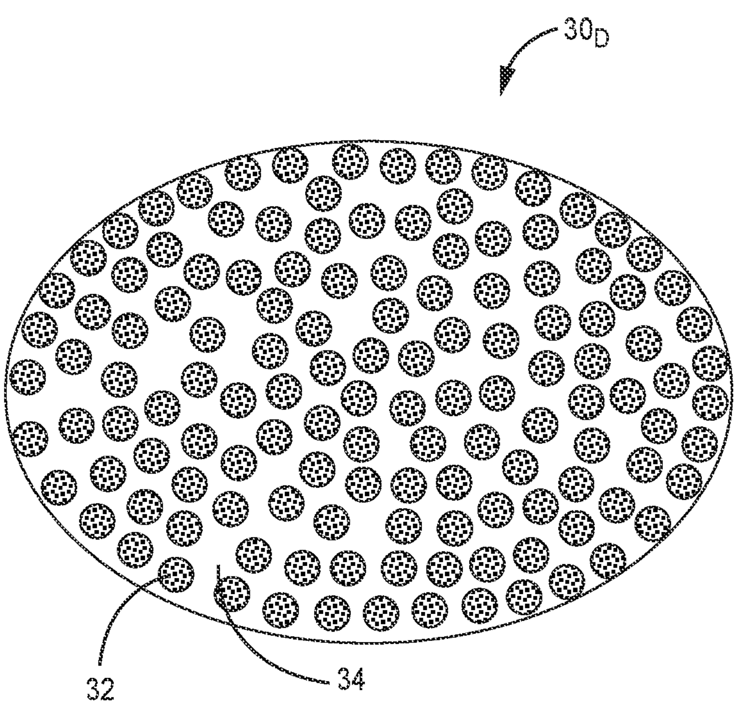
FIG. 4 is a simplified cross-sectional illustration of the ceramic tow in a third state.
Figure 5:
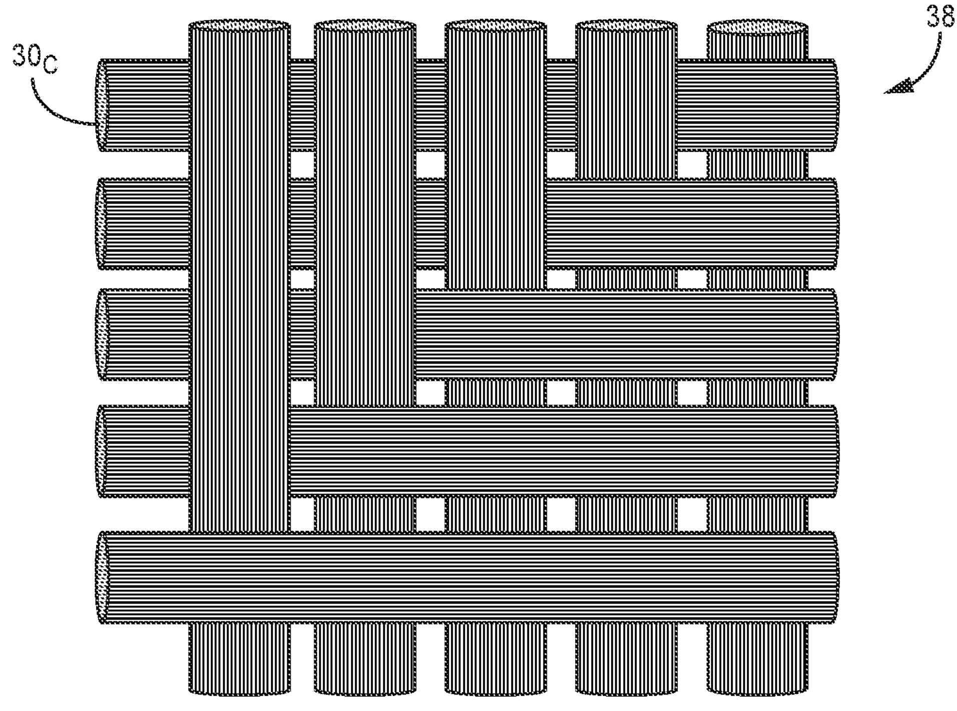
FIG. 5 is a simplified illustration of a ceramic fabric incorporating tows in the second state depicted in FIG. 3.

FIG. 1 is a flowchart illustrating steps 12-28 of method 10, used to fabricate a CMC component from dispersed tows. FIGS. 2, 3, and 4 are simplified cross-sectional illustrations of a ceramic tow in a first, unmodified state, a second, stabilized state, and a third, dispersed state, respectively. FIG. 5 is a simplified illustration of a ceramic fabric incorporating stabilized tows. Method 10 is described below in combination with FIGS. 2-5.

Tow 30 can be a bundle of roughly 500 to 1,000 silicon carbide filaments 32 with inter-filament gaps or pores 34 surrounding filaments 32. It can be desirable to increase the volume of pores 34 within tows 28 or, stated another way, to increase spacing between adjacent filaments 32 to facilitate more even IFC deposition and matrix infiltration within a ceramic preform containing tows 28. In furtherance of this objective, method 10, discussed below, includes the dispersal of filaments 32.

At step 12, tow 30 can be prepared for dispersal, which in an exemplary embodiment, can include desizing of tow 30 to remove its polymer coating in order to enhance dispersal of filaments 32. Desizing can be carried out via any suitable thermal or chemical means.

At step 14, a coating of a polymeric composition including a first polymer binder can be applied to tow 30. The application process can include drawing tow 30 (e.g., tensioned on rollers) through a bath containing the polymeric composition. In one embodiment, the polymeric composition can be a solution of a polyvinyl alcohol (PVA) as the first polymer binder with water as the solvent. Alternatively, the polymeric composition can be a solution of polyvinyl butyral (PVB) as the first polymer binder in an alcohol (e.g., ethanol) solvent. A solution of PVB can further optionally include water as a second solvent, as is discussed in greater detail below. Either solution, that is, of PVA or PVB, can further optionally include a surfactant and/or other modifiers to properties of the polymeric composition or the first polymer binder.

In an alternative embodiment, the polymeric composition can be a slurry of the first polymer binder (e.g., PVA or), a solvent (e.g., water or ethanol), and particles ranging from 1 micron to 20 microns in diameter. These particles can include carbides (e.g., silicon carbide or boron carbide), borides (e.g., zirconium borides or hafnium borides), and/or oxides (e.g., of hafnium, aluminum, zirconium, or ytterbium) intended to remain as part of the structure through matrix formation to help enhance matrix formation and sealing properties of the resultant CMC component at high temperatures.

In yet another alternative embodiment, the first polymer binder can be vapor deposited on filaments 32 using, for example, chemical vapor deposition (CVD) in which the polymeric composition can include a reactive monomeric precursor introduced to tow 30 which forms a film of the first polymer binder on filaments 32 without the need for a solvent. In such case, the first polymer binder can be a fluoropolymer, a parylene, an acrylate, a methacrylate, a styrene, or N-vinylpyrrolidone, to name a few, non-limiting examples.

At step 16, a post-application treatment for dispersing and stabilizing tow 30 can be carried out. As such, tow 30 can be subjected to mechanical dispersal means, such as a stream of air from an air knife to help separate filaments 32. The stream of air, along with any surfactant included in the applied polymeric composition can help to evaporate the solvent, leaving behind a solid first polymer binder to coat filaments 32. In an alternative embodiment, a second liquid generally immiscible in the solvent of the polymeric composition can be introduced to tow 30 just prior to the application of mechanical dispersal means. The second liquid, which can be considered a dispersing liquid as it further facilitates dispersal of filaments 32, can be similarly introduced to tow 30 by way of a bath. The bath can include ultrasonication for additional mechanical dispersal. An ideal second liquid is immiscible in the solvent(s) of the polymeric composition, as noted above, and should further have a lower surface tension than such solvents so that the second liquid can help to further draw away the solvent. Accordingly, the second liquid can be a non-polar, organic liquid, such as hexane. Hexane is immiscible with water, and can have some degree of miscibility with alcohols, depending on, for example, the length of hydrocarbon chains. As such, a polymeric composition of PVB and ethanol can, as noted above, include water (≤5%) to improve immiscibility of the polymeric composition with hexane. In addition to mechanical separation, the stream of air also helps to dry tow 30 such that any solvent(s) and/or dispersing liquid evaporates and filaments 32 are coated with the first polymer binder (shown in FIG. 3 as coating 36) and tow 30 is stabilized.

Stabilized, coated tow $\mathbf{30}_C$ (i.e., having coated filaments $\mathbf{32}_C$) is shown in FIG. 3. Steps 14 and 16 are carried out such that coating 36 can be applied to as many filaments 32 as possible and as evenly as possible along each individual filament 32. For a given filament 32, coating 36 can have a thickness ranging from 0.5 microns to 5.0 microns such that the amount of first polymer binder in stabilized tow $\mathbf{30}_C$ ranges from 2 wt % to 20 wt %, and ideally, 10 wt % to 20 wt %. As an example, for a 500-filament tow $\mathbf{30}/\mathbf{30}_C$, a coating thickness of 1 micron can yield about 9 wt % of the first polymer binder.

At step 18, multiple coated tows $\mathbf{30}_C$ can be incorporated into a ceramic fabric (e.g., fabric 38 of FIG. 5). The ceramic fabric can be woven (as shown), braided, or in some cases arranged into unidirectional tapes. Such fabrics or tapes can include only coated tows $\mathbf{30}_C$ or can include a mixture of coated tows $\mathbf{30}_C$ and standard tows (i.e., with only non-coated filaments 32).

At step 20, a tackifier composition can be applied to the ceramic fabric to help facilitate the preforming process described below in step 22. More specifically, the tackifier composition can include a second polymer binder (e.g., PVB or PVA) which imparts "tack" to the ceramic fabric for improved handling. The tackifier composition can be a solution including the second polymer binder and a suitable solvent which preferably does not solubilize the first polymer binder of coating 36. As such, if the first polymer binder is PVA, then the tackifier composition can be a solution of PVB in ethanol. Since PVA is not readily soluble in ethanol, the enhanced filament-to-filament spacing created by the coating 36 of each coated tow $\mathbf{30}_C$ can be maintained through the debulking and preforming processes. The converse is also true, as PVB is not readily soluble in water, which is the preferred solvent for a tackifier composition including PVA. As such, using different polymer binders with different solubility characteristics helps assure that the first polymer binder (e.g., PVA) will maintain the enhanced inter-filament spacing of coated tow $\mathbf{30}_C$ when exposed to the solvent of the tackifier composition (e.g., ethanol). The tackifier composition can be applied to the ceramic fabric via spraying, dipping, pipetting etc. The ceramic fabric can alternatively be impregnated with the tackifier composition (i.e., to form a prepreg). The ceramic fabric can subsequently be dried to evaporate the solvent of the tackifier composition.

At step 22, sheets, plies, etc., derived from the ceramic fabric can be laid up into a preform. In some embodiments, the tackifier composition can be applied to the preform, including amounts supplementing an initial application during step 20. Debulking of the preform can also be carried out during step 22 as necessary during and/or after layup. The presence of coatings 36 of the first polymer binder helps maintain the increased inter-filament spacing within coated tows $\mathbf{30}_C$ through step 22. Debulking is preferably carried out at temperatures at or below 350° F. (176.7° C.) to minimize softening and/or migration of the first polymer binder.

At step 24, the first and second polymer binders can be decomposed. In an exemplary embodiment, the first and second polymer binders can be thermally decomposed by placing the preform in an environment containing air or an inert gas (e.g., nitrogen), or in a vacuum, and exposing the preform to elevated temperatures, for example, up to 2000° F. (1093.3° C.). Decomposition can be carried out in situ (i.e., within the reactor used in step 22), or ex situ. Substantially all of the first and second polymer binders are decomposed at step 20, although some polymer ash may remain. Removal of the first polymer binder in this step results in dispersed tow $\mathbf{30}_D$ shown in FIG. 4. Dispersed tow $\mathbf{30}_D$ has greater inter-filament spacing than tow 30 of FIG. 2, as the first polymer binder of coatings 34 was used to disperse filaments 32 and maintain the increased spacing through preforming.

At step 26, the preform can undergo IFC deposition using chemical vapor infiltration (CVI). The IFC can include multiple individual layers of materials such as boron nitride, silicon-doped boron nitride, silicon carbide, and/or silicon nitride. The increased inter-filament spacing of dispersed tow $\mathbf{30}_D$ allows the IFC to coat individual filaments 28 more uniformly. This imparts greater performance of the IFC in an operating environment, including an enhanced degree of debonding and crack deflection under oxidizing conditions.

At step 28, the preform can be densified with a matrix using CVI to form a CMC component. During densification, the rigidized preform is infiltrated by reactant vapors, and a gaseous precursor deposits on the ceramic tows. The matrix material can be silicon carbide or other suitable ceramic material. Densification is carried out until the resulting CMC has reached the desired residual porosity. In an alternative embodiment, densification can additionally and/or alternatively include other methodologies such as, but not limited to, melt infiltration (MI) and polymer infiltration and pyrolysis (PIP).

The disclosed dispersed tows can be used to form features in CMC components for use in aerospace, maritime, or industrial equipment, to name a few, non-limiting examples.

Discussion of Possible Embodiments

The following are non-exclusive descriptions of possible embodiments of the present invention.

A method of fabricating a fibrous ceramic preform includes forming a plurality of coated ceramic tows by introducing a polymeric composition to each of a plurality of ceramic tows, and dispersing and stabilizing each of the plurality of ceramic tows such that a coating of a first polymer binder forms on individual filaments of respective ones of the plurality of ceramic tows, incorporating the plurality of coated ceramic tows into a ceramic fabric, applying a tackifier composition comprising a second polymer binder and a second solvent to the ceramic fabric, and incorporating the ceramic fabric into the preform. The first polymer binder is insoluble in the second solvent.

The method of the preceding paragraph can optionally include, additionally and/or alternatively, any one or more of the following features, configurations and/or additional steps:

In the above method, the step of introducing the polymeric composition can include drawing each of the plurality of ceramic tows through a bath containing the polymeric composition.

In any of the above methods, the polymeric composition can include the first polymer binder and a first solvent.

In any of the above methods, the first polymer binder can be polyvinyl alcohol, and the first solvent can be water.

In any of the above methods, the first polymer binder can be polyvinyl butyral, and the first solvent can be ethanol.

In any of the above methods, the polymeric composition can further include at least one of a surfactant and particles.

In any of the above methods, the step of dispersing and stabilizing each of the plurality of ceramic tows can include applying a stream of air to each of the plurality of ceramic tows.

In any of the above methods, the step of dispersing and stabilizing each of the plurality of ceramic tows can include introducing a dispersing liquid to each of the plurality of ceramic tows.

In any of the above methods, the dispersing liquid can be at least partially immiscible in the first solvent of the polymeric compound.

In any of the above methods, the dispersing liquid can be an organic, non-polar liquid.

In any of the above methods, the step of applying the tackifier composition to the ceramic fabric can include one of spraying, pipetting, dipping, and prepregging.

In any of the above methods, an amount of the first polymer binder in each of the plurality of coated ceramic tows can range from 2 wt % to 20 wt %.

In any of the above methods, a thickness of the coating of the first polymer binder on each of the plurality of ceramic tows can range from 0.5 microns to 5.0 microns.

In any of the above methods, the step of introducing the polymeric composition can include depositing a reactive precursor on the individual filaments.

In any of the above methods, the first polymer binder can be one of fluoropolymer, a parylene, an acrylate, a methacrylate, a styrene, and N-vinylpyrrolidone.

A method of fabricating a CMC component can include debulking any of the above preforms, decomposing the first polymer binder and the second polymer binder, depositing an interface coating on the preform, and subsequently, densifying the preform with a ceramic matrix.

In any of the above methods, the step of debulking the preform can include heating the preform to a temperature at or below 350° F.

In any of the above methods, the step of decomposing the first polymer binder and the second polymer binder can include heating the preform in the presence of air or an inert gas.

In any of the above methods, the step of depositing the interface coating can include depositing at least one of boron nitride, silicon-doped boron nitride, silicon carbide, and silicon nitride using chemical vapor infiltration.

In any of the above methods, the step of densifying the preform with a ceramic matrix can be carried out using at least one of chemical vapor infiltration, melt infiltration, and polymer infiltration and pyrolysis.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of fabricating a fibrous ceramic preform, the method comprising:
- forming a plurality of coated ceramic tows by:
  - introducing a polymeric composition to each of a plurality of ceramic tows by drawing each of the plurality of ceramic tows through a bath containing the polymeric composition, wherein the polymeric composition comprises a first polymer binder and a first solvent;
- dispersing and stabilizing each of the plurality of ceramic tows by introducing a dispersing liquid to each of the plurality of ceramic tows such that a coating of a first polymer binder forms on individual filaments of respective ones of the plurality of ceramic tows wherein the dispersing liquid is at least partially immiscible in the first solvent of the polymeric composition;
- incorporating the plurality of coated ceramic tows into a ceramic fabric;
- applying a tackifier composition comprising a second polymer binder and a second solvent to the ceramic fabric; and
- incorporating the ceramic fabric into the preform,
- wherein the first polymer binder is insoluble in the second solvent.

2. The method of claim 1, wherein the first polymer binder is polyvinyl alcohol, and wherein the first solvent is water.

3. The method of claim 1, wherein the first polymer binder is polyvinyl butyral, and wherein the first solvent is ethanol.

4. The method of claim 1, wherein the polymeric composition further comprises at least one of a surfactant and particles.

5. The method of claim 1, wherein the step of dispersing and stabilizing each of the plurality of ceramic tows comprises applying a stream of air to each of the plurality of ceramic tows.

6. The method of claim 1, wherein the dispersing liquid is an organic, non-polar liquid.

7. The method of claim 1, wherein the step of applying the tackifier composition to the ceramic fabric comprises one of spraying, pipetting, dipping, and prepregging.

8. The method of claim 1, wherein an amount of the first polymer binder in each of the plurality of coated ceramic tows ranges from 2 wt % to 20 wt %.

9. The method of claim 1, wherein a thickness of the coating of the first polymer binder on each of the plurality of ceramic tows ranges from 0.5 microns to 5.0 microns.

10. The method of claim 1, wherein the step of introducing the polymeric composition comprises depositing a reactive precursor on the individual filaments.

11. The method of claim 10, wherein the first polymer binder is one of fluoropolymer, a parylene, an acrylate, a methacrylate, a styrene, and N-vinylpyrrolidone.

12. A method of fabricating a CMC component, the method comprising:
- debulking the preform of claim 1;
- decomposing the first polymer binder and the second polymer binder;

depositing an interface coating on the preform; and subsequently, densifying the preform with a ceramic matrix.

13. The method of claim 12, wherein the step of debulking the preform comprises heating the preform to a temperature at or below 350° F.

14. The method of claim 12, wherein the step of decomposing the first polymer binder and the second polymer binder comprises heating the preform in the presence of air or an inert gas.

15. The method of claim 12, wherein the step of depositing the interface coating comprises depositing at least one of boron nitride, silicon-doped boron nitride, silicon carbide, and silicon nitride using chemical vapor infiltration.

16. The method of claim 12, wherein the step of densifying the preform with a ceramic matrix is carried out using at least one of chemical vapor infiltration, melt infiltration, and polymer infiltration and pyrolysis.

* * * * *